(12) United States Patent
Kedem et al.

(10) Patent No.: US 6,363,385 B1
(45) Date of Patent: Mar. 26, 2002

(54) METHOD AND APPARATUS FOR MAKING INDEPENDENT DATA COPIES IN A DATA PROCESSING SYSTEM

(75) Inventors: Ishay Kedem, Brookline; Hana Moreshet, Framingham; Douglas E. LeCrone, Hopkinton, all of MA (US); Bruce A. Pocock, Titusville, FL (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/342,608

(22) Filed: Jun. 29, 1999

(51) Int. Cl.[7] .................. G06F 17/30; G06F 12/00
(52) U.S. Cl. .................. 707/10; 707/201; 707/202; 707/204
(58) Field of Search .................. 707/10, 204, 201, 707/202

(56) References Cited

U.S. PATENT DOCUMENTS

| 4,866,611 A | * | 9/1989 | Cree et al. ............... 364/300 |
|---|---|---|---|
| 5,434,994 A | | 7/1995 | Shaheen et al. ........... 395/500 |
| 5,596,706 A | * | 1/1997 | Shimazaki et al. ..... 395/182.04 |
| 6,101,497 A | * | 8/2000 | Ofek ............................ 707/10 |

* cited by examiner

Primary Examiner—Frantz Coby
(74) Attorney, Agent, or Firm—George A. Herbster

(57) ABSTRACT

A method for copying a data file from a source device to a destination device. In response to a copy command from a requesting host application identifying the source file and the storage locations in a destination, an extents track is formed to establish an environment in which the file will be copied. The calling system receives an immediate response that the copy operation is complete even though no data has been copied. Application programs may access the file in either the source or the destination. A copy program transfers the file on a track-by-track basis to the destination storage locations. Procedures assure that any data access to a particular track in either the source or destination by any application prior to the transfer of that track are accommodated to maintain data integrity.

28 Claims, 12 Drawing Sheets

| CALL FROM DESTINATION DEVICE | CALL FROM SOURCE DEVICE |
|---|---|
| SOURCE DEVICE NUMBER | DESTINATION DEVICE NUMBER |
| RECORD NUMBER OF STARTING EXTENT | CYLINDER ADDRESS OF DESTINATION DEVICE |
| RECORD NUMBER OF ENDING EXTENT | HEAD IDENTIFIER OF DESTINATION DEVICE |

FIG. 4

METHOD AND APPARATUS FOR MAKING INDEPENDENT DATA COPIES IN A DATA PROCESSING SYSTEM

CROSS-REFERENCE TO A RELATED APPLICATIONS

U.S. Pat. No. 6,101,497 issued Aug. 8, 2000 by Yuval Ofek for a Method and Apparatus for Independent and Simultaneous Access to a Common Data Set, which application is assigned to the same Assignee as this application.

BACKGROUND OF THE INVENTION

1. Field of the Invention

This invention generally relates to data storage in data processing systems and more particularly to a method for copying data from one storage device to another storage device.

2. Description of Related Art

Copying data from one location, commonly a "source location" to a second or "destination location" is well known in the art. In some situations copying provides data redundancy. In other situations providing two or more copies enables a like number of independent applications or procedures to process the copied data independently.

In one conventional approach, as particularly well known in the use of personal computers, copying is performed on a file-by-file basis between different logical volumes or between different directories on the same logical volume. The conventional device utilizes a "copy" command that specifies a path to a source and file to be copied and a path to a destination location. The processor then copies the data from the source to the location. During the copy process no application can access the data at either the source location or the destination location.

In other systems involving larger and more sophisticated data storage facilities, applications may operate on multiple host processors. Such facilities often have the capability of performing copying independently of other host applications. That is, while data is being copied from a source to a destination, other programs or processes can operate on data in locations other than the source or destination file locations. However, in these systems any access to the source file or the destination file is precluded until such time the copy has been, completed.

The above-identified U.S. Pat. No. 6,101,497, discloses an alternate procedure by which data in one logical volume can be transferred to a second logical volume thereby to provide a copy of the logical volume including all the files and records in that logical volume. This process occurs independently of processor operations, so the copy command does not impose any undue processor loading and does not detract from the ability of other processes to operate on other data in the data storage facility. During the copying process, however, both the source and destination logical volumes, that are formed as a standard and a BCV logical volume in the context of the above-identified U.S. Pat. No. 6,101,497, prevent any other process from accessing the copies.

In such systems data can be identified either by physical or logical addresses. Physical addressing includes the identification of device number, a track number and a record number. Logical addressing refers to a logical volume, a file and in some instances a record. Each of these elements has a "granularity", which term of differing values. For the physical device granularity, from the coarsest to the finest granularity is ranked as a physical disk, a track, a sector and a record; in logical devices, the element ranking is logical volume, file and record.

In the foregoing U.S. Pat. No. 6,101,497 Ser. No. 08/842, 953 copying is done by logical volume, that is with the coarsest granularity. If it is only desired to transfer a subset of data with a finer granularity, such as a file, such logical volume transfers can produce unnecessary delays. What is therefore needed is a method for copying data from a source to a destination independently of any processor operation with a minimal delay between the processing of a copy command initiating a copy process and the availability of both the source and destination locations for processing by different applications.

SUMMARY

Therefore it is an object of this invention to provide an improved method for copying data from a source to a destination in a data storage facility.

Another object of this invention is to provide an improved method of copying data from a source location to a destination location that occurs essentially independently of any host processes.

Still another object of this invention is to provide an improved method of copying data from a source to a destination with a minimum interruption to the interaction of processes operating on the source locations and the initiation of operations with the destination locations.

Yet another object of this invention is to provide a method for transferring a subset of data, such as a file, from a source to a destination device in a system that normally transfers data with a coarser granularity, such as transfers by logical volume.

In accordance with this invention a data processing system includes a host device for generating commands during the processing of a host application. A host application has the capability of generating a command to initiate a process by which data is copied from a predetermined source storage location to predetermined destination storage locations. This method initially establishes an operating environment by generating a list of the predetermined source storage locations and a list of the predetermined destination storage locations. Thereafter, a message is sent to the host application indicating that the copying has occurred whereupon the source and destination storage locations become available for use. Thereafter copying of the data begins from the predetermined storage locations in an ordered manner that includes copying the data from each predetermined source location to each predetermined destination location and updating the list to indicate that the data has been transferred.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 4 is a data structure for a request that is useful in this invention;

DESCRIPTION OF ILLUSTRATIVE EMBODIMENTS

Figure 1:
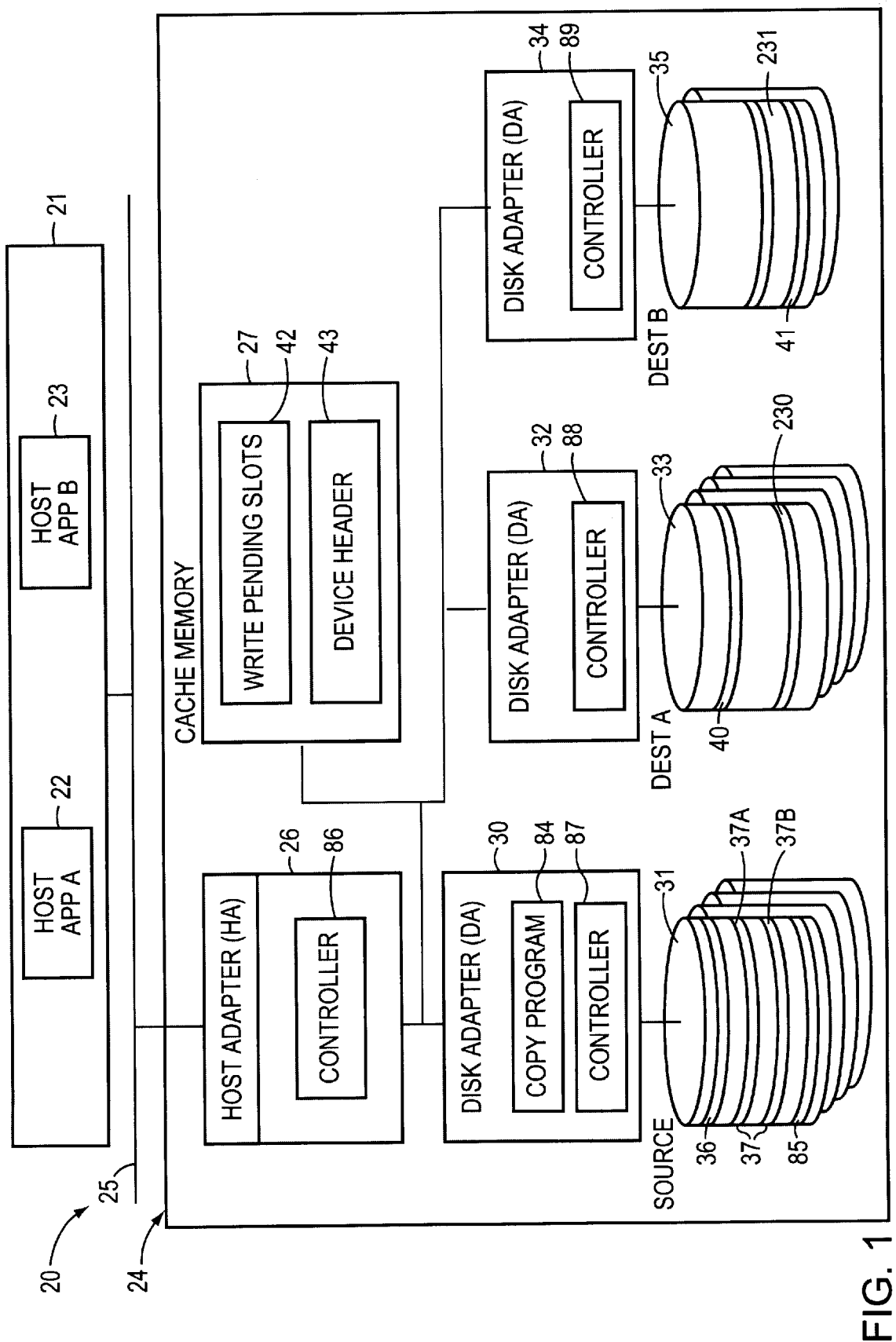
FIG. 1 is a block diagram of a data processing system, including a data storage facility, adapted for implementing this invention.

FIG. 1 depicts a data processing system 20 in which a host array 21 with one or more host devices controls operations. Each host device processes a program and in the following discussion "host application" means a particular application program, procedure, process, module or the like being processed on a host. FIG. 1 depicts two such applications, namely: a HOST APP A application 22 and a HOST APP B application 23.

Each host application accesses and processes data stored in a data storage facility 24 over a system bus 25 that can take any of several known forms including single and parallel bus structures. For purposes of this explanation the data storage facility 24 can be considered to store all the data that will be processed either by HOST APP A application 22 or HOST APP B application 23.

This invention can be implemented in a number of disk storage facilities of different types and configurations. The following description is made in the context of a specific data storage facility 24, namely a Symmetrix disk array storage device (DASD). However, the adaptation of this specifically described embodiment for implementing the invention with other devices will be readily apparent to persons of ordinary skill in the art.

A Symmetrix disk array storage device as a data storage facility 24 includes a host adapter 26 and a cache memory 27 that communicate with each other and with a series of disk adapters and physical disk drives. FIG. 1 depicts, for example, a first disk adapter (DA) 30 with an array of physical disks that store one or more logical volumes including a logical volume 31; a disk adapter 32, a logical volume 33; and a disk adapter 34, a logical volume 35. While the configuration of data is entirely arbitrary, for purposes of explaining this invention it is assumed that a physical device stores a logical volume. As is known, however, a logical volume may comprise a portion of a single physical device, a complete physical device, portions of multiple physical devices or even multiple complete physical devices. Such logical devices may also contain discrete data sets or files. FIG. 1 depicts a first file 36 in a set of contiguous data tracks and a file 37 located in two separated sets 37A and 37B of contiguous data tracks.

In accordance with this invention, transferring the file 36 to a predetermined file location 40 in the logical volume 33 and the file 37 into a set of contiguous locations 41 in the logical volume 35 does not require the transfer of all the data in the logical volume 31. Rather, in accordance with this invention only the data in file 36 will transfer to the logical volume 33 and only the data in the file 37 will transfer to the locations in the logical volume 35.

For purposes of these two specific transfers, the logical volume 31 is a source and so is termed a source device 31 while the logical volumes 33 and 35 are destinations and are termed a DEST A device 33 and a DEST B device 35.

Assume the HOST APP A application 22 processes data in the file 36. That application or any other host application as a requesting host application could then determine a need to make a copy of that file at the storage locations 40 in the DEST A device 33 for use by the HOST APP B application 23. The requesting host application achieves this result by issuing a special copy command (e.g., a FILE SMMF command) that identifies a file in a source device, such as the file 36 and a destination for that file, such as the storage location 40 in the DEST A device 33.

The requesting host application and the host adapter 26 interact to establish the environment for the transfer as will be described in greater detail with respect to FIG. 5. During the time required to establish the environment, normally, within a few milliseconds, the source device 31 and DEST A ion device 33 are locked; they are not available to any host application including the requesting host application. However, as soon as the environment is established and the host adapter produces an internal command for producing the copy, the source device 31 and DEST A device 33 are enabled to communicate with any host applications. For example, the HOST APP A and HOST APP B applications 22 and 23 might be enabled to interact with the file 36 and the copy at the storage location 40.

Immediately after the environment is established, there is no valid data in the DEST A device 33. However, and again as will be more clearly stated later, a copy program proceeds in an orderly fashion to make the copy. Any attempt to write data to the file 36 in source device 31 or to read or write data from any copy, such as the file copy in the storage locations in the DEST A device 33, produces a priority transfer of relevant data so that the data in the two copies of the data file are maintained with integrity.

Figure 2:
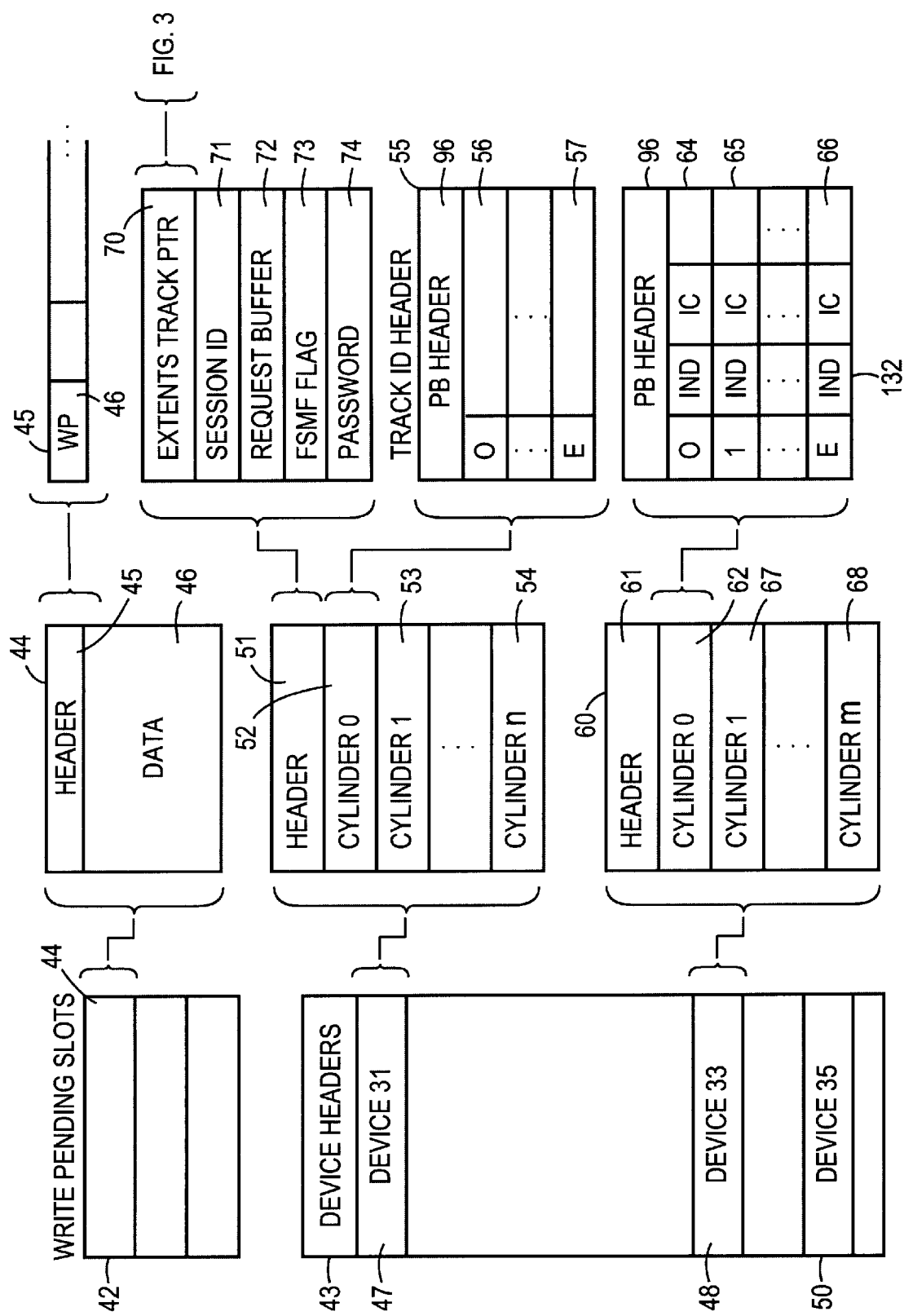
FIG. 2 is a more detailed description of a cache memory shown in FIG. 1.

FIG. 2 depicts in detail those portions of the cache memory 27 that are relevant to this invention, particularly with respect to write pending slots 42 and device headers 43. Use of data structures within a cache memory as write pending slots and device headers is generally well-known in the art. An individual write pending slot, such as a write pending slot 44, includes a header 45 followed by the data in a data block 46. Normally this data block will contain the data for one physical track. Each header 45 includes a WP flag 46 that indicates a need for write operations or destaging, of data from one of the write pending slots 42 to some location in a physical disk device. Once the data is transferred from the cache memory 27 to a corresponding data storage device, such as the source device 31, the system clears the WP bit 46 for that slot. Each header includes other information that is not relevant to this invention and, accordingly, is not shown.

The device headers 43 will include one entry for each logical device in the Symmetrix DASD. Three such entries are shown, namely: entry 47 for the device 31; entry 48 for device 33; and entry 50 for device 35. Each of these entries has the same organization. That is, the device entry 47 includes a header 51 and a plurality of entries for each cylinder in the device 31. Three specific entries are shown, namely: a Cylinder 0 entry 52, a Cylinder 1 entry 53 and a Cylinder n entry 54. The header 51 has a structure or block 55 as shown in FIG. 2 and is described in further detail later. Each of the cylinder entries, such as Cylinder 0 entry 52, points to a block of locations that define a Track ID table 55 with each location being assigned to a particular track in the cylinder. Two track entries are shown in the Track ID table 55, namely: a Track 0 entry 56 and a Track E entry 57 for individual physical devices in which each cylinder comprises fifteen data tracks.

The device entry 48 comprises a block 60 that includes a header 61 and cylinder entries. FIG. 2 depicts three particular cylinder entries including a Cylinder 0 entry 62 that identifies a Track ID Table 63. The Track ID Table 63 includes, in this particular embodiment, three entries, namely: a Track 0 entry 64, a Track 1 entry 65 and a Track E entry 66. Additional cylinder entries in the block 60 will be included. FIG. 2 depicts two such entries, namely: a Cylinder 1 entry 67 and a Cylinder m entry 68. As will become apparent, n=m or n≠m. The DEST B device entry 50 will have an analogous structure.

Still referring to FIG. 2, the header block 51 for the source device entry 47 includes various items of information that will be interpreted differently depending upon whether a particular device is acting as a source or as a destination device. FIG. 2 discloses a specific implementation in which a header block 51 includes an extent track pointer 70, a session ID entry 71, a request buffer 72, an FSMF flag 73 and a password entry 74. When the header 51 is associated with a source device, the password entry will have a predetermined value. This value will define the extents track pointer 70 as containing an address to an extents track 75 shown in greater detail in FIG. 3 as comprising a header 76 and one or more extent buffers 77. Details of the header 75 and extent buffers 77 will be described in greater detail later. The FSMF 73 indicates whether the device is a destination device as used in this invention or a BCV device as disclosed in U.S. Pat. No. 6,101,497.

A copy program that operates independently of the host processor array 21 is an integral component of this invention. This program operates in response to a command with a particular data structure that is shown in FIG. 4. This structure contains alternate entries depending upon whether the request comes from a source device or a destination device. If the request for destination device operation, a block 81 will contain a source device number; a block 82, the record number for the starting extent; and a block 83, a record number for the ending extent. If the request is for a source device the block 81 contains a destination device number; block 82, a cylinder address for the destination device; and block 83, a head identifier for the destination device.

In the disclosed embodiment, a request, in either form, directs a copy program located in the disk adapter associated with the source device, such as the copy program 84 in the disk adapter 30, to begin a process by which data is copied from the source to the destination device.

Figure 3:
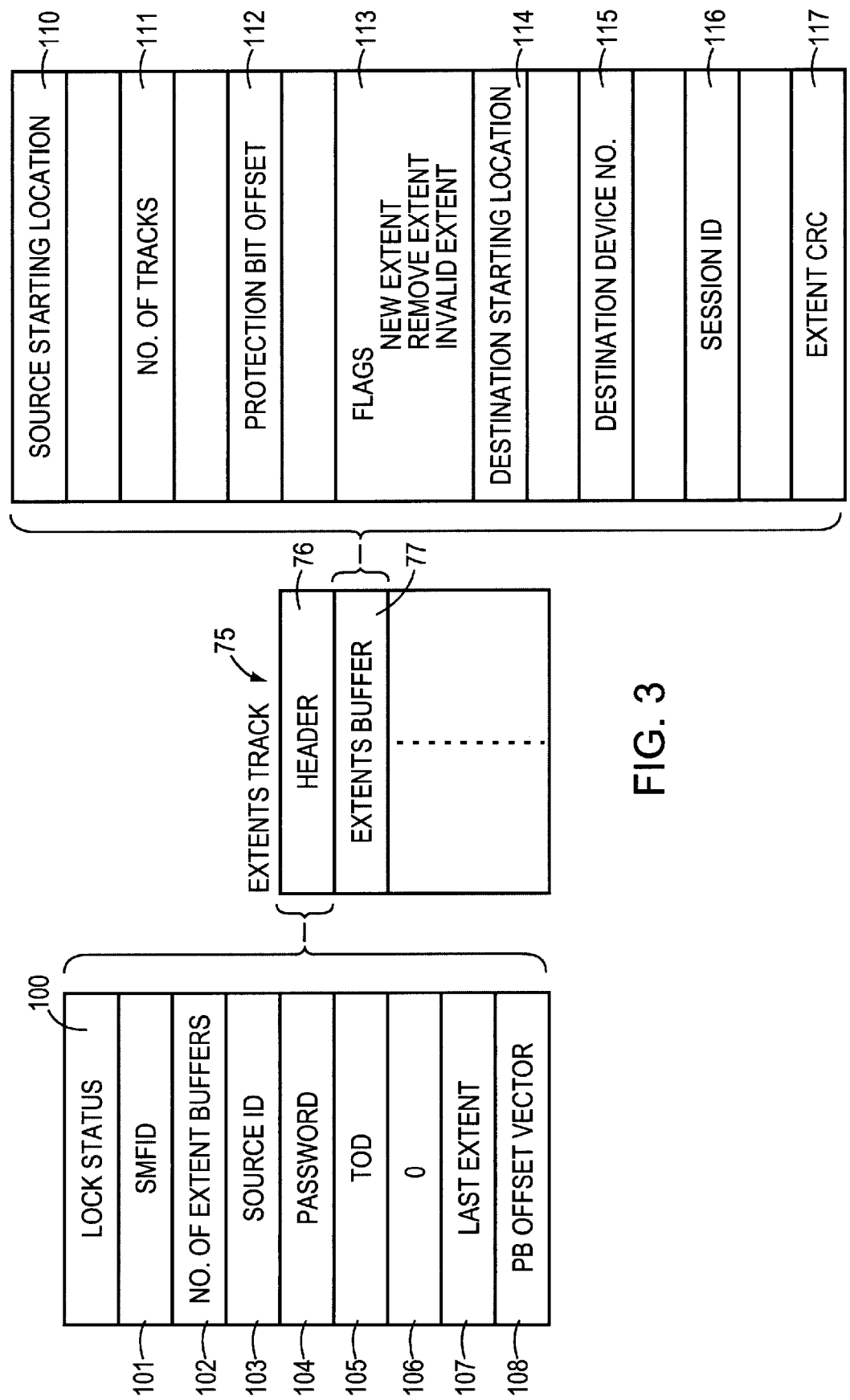
FIG. 3 is a still more detailed view of an extents track in the cache memory of FIG. 2.

Now referring to the operation as described in FIGS. 5 through 10, it can be considered that a File SMMF copy command produce operating phases as follows:

1. a first phase that begins when a requesting host application issues a "File SMMF" command and ends when a response is sent to the requesting host application indicating that the copy command has been processed. During this phase the requesting host application, the host adapter and source device adapter produce an extents track structure as shown in FIG. 3 for storage in an extents track at a location defined by the requesting host application. As an example, the requesting host application could assign the extents track to a track 85 in the source device 31 in FIG. 1 that then could be accessed by any device. For maximum effectiveness the requesting host application could also set a parameter so that the extents track also resided in the cache memory 27 for the duration of the operation.

2. A second phase that begins when a request for a copy operation is generated and ends when all the data has been copied. During this phase the copy program in the source device duplicates the data on a track-by-track basis in the selected destination storage locations. More specifically, if the File SMMF command identifies the file 36 as the source and locations 40 as the destination, each track in the is file 36 will transfer to locations 40 in sequence. If the File SMMF command identifies the file 37, the copy program will transfer from the two non-contiguous sites 37A and 37B in the source device 31 to the contiguous track locations 41 in the DEST B device 35. During this phase any attempt to access data on either the source or destination device is handled in an expeditious manner.

3. A modification/termination phase during which the copy operation can be modified or terminated.

In Symmetrix DASD data storage facility system each host adapter, such as host adapter 26, and disk adapter, such as the disk adapters 30, 32 and 34, contains a controller such as a controller 86 in the host adapter 26, a controller 87 in the disk adapter 30, a controller 88 in the disk adapter 32 and a controller 89 in the disk adapter 34. Each such controller has a similar structure and comprises a microprocessor that will include its own random access memory and that has access to the cache memory 27.

Figure 6:
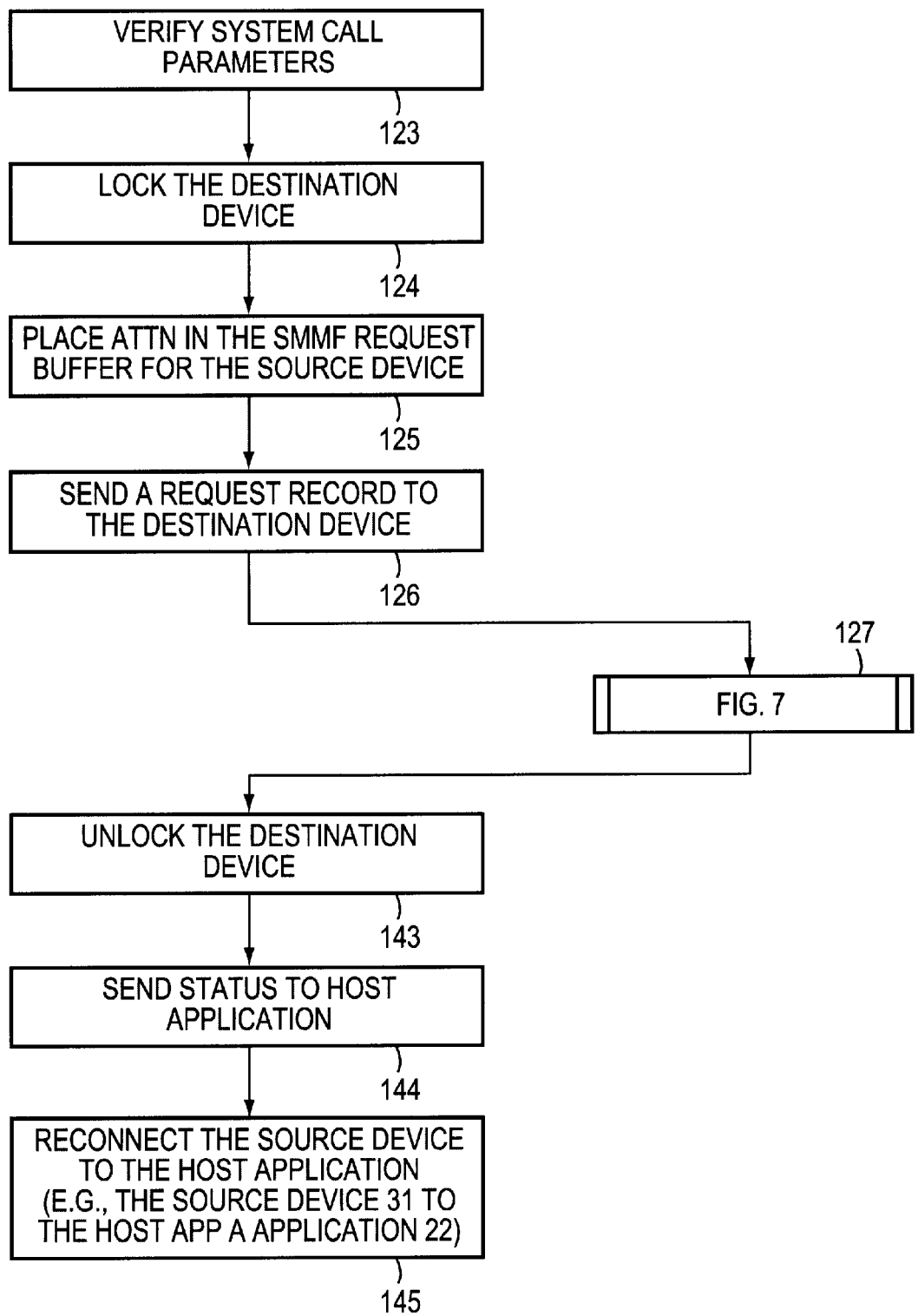
FIG. 6 is a more detailed flow diagram of a portion of the process depicted in FIG. 5.
Figure 7:
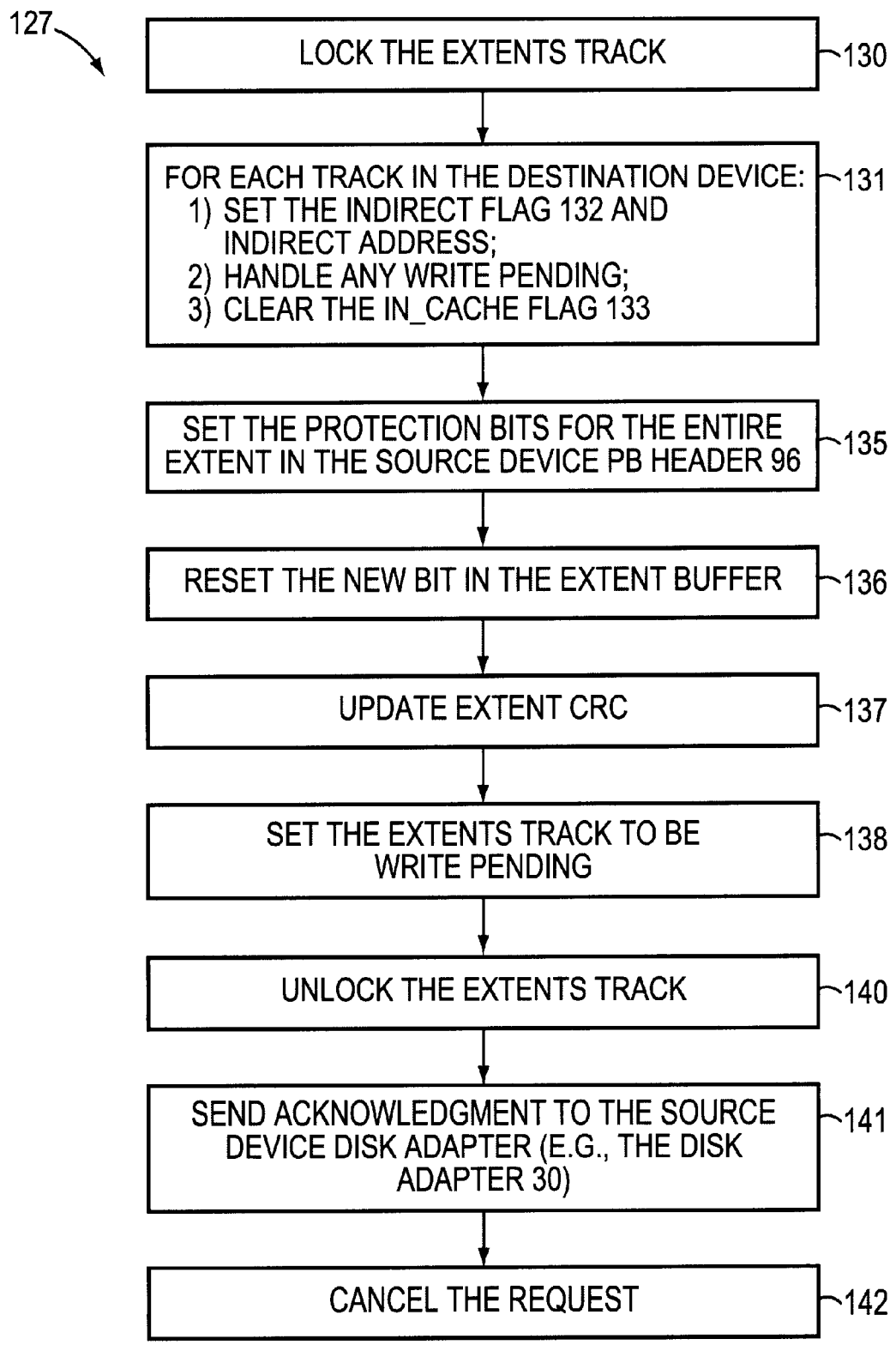
FIG. 7 is a more detailed flow diagram of a portion of the process depicted in FIG. 6.
Figure 8:
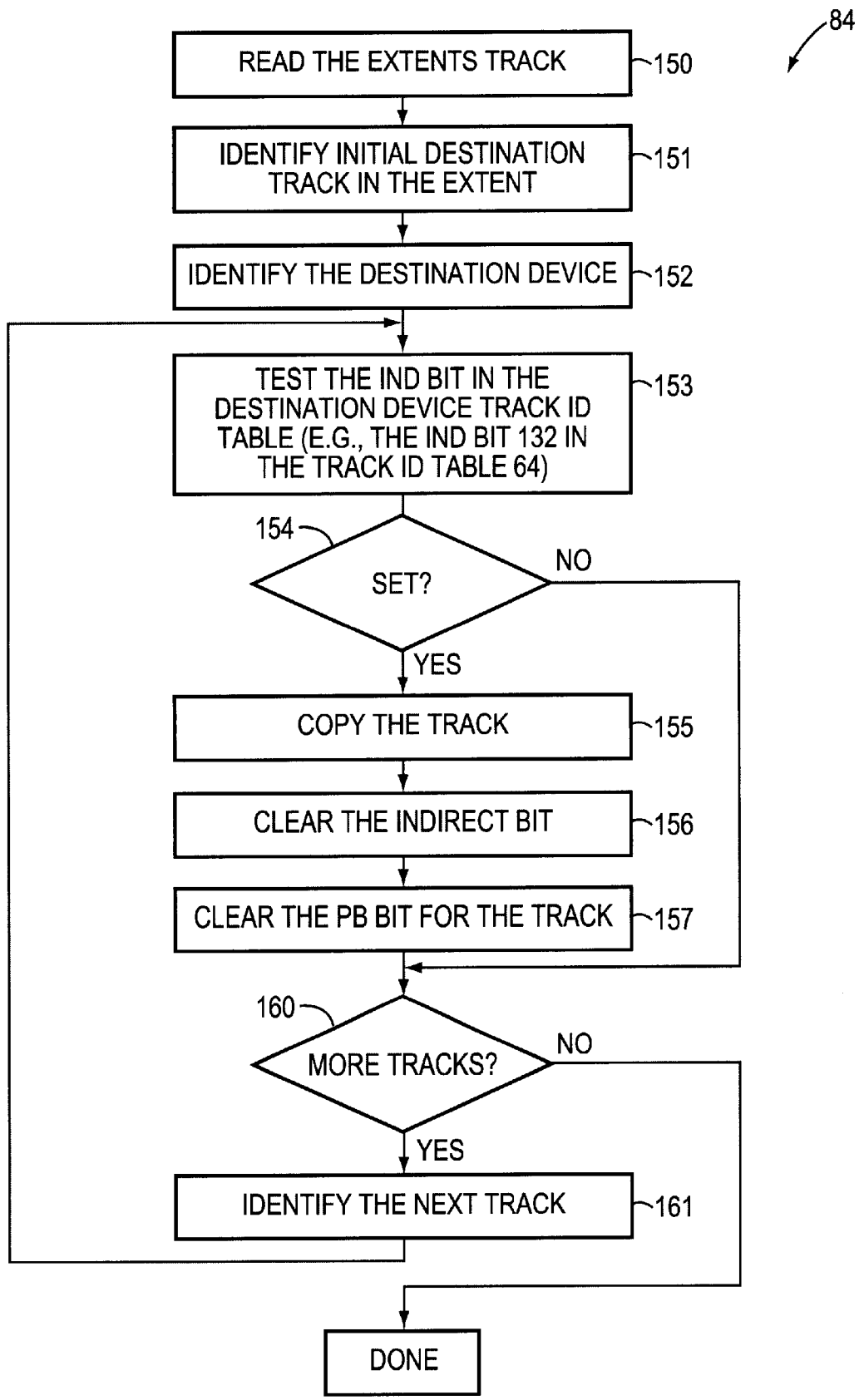
FIG. 8 depicts a copy program that is useful in accordance with this invention.
Figure 9:
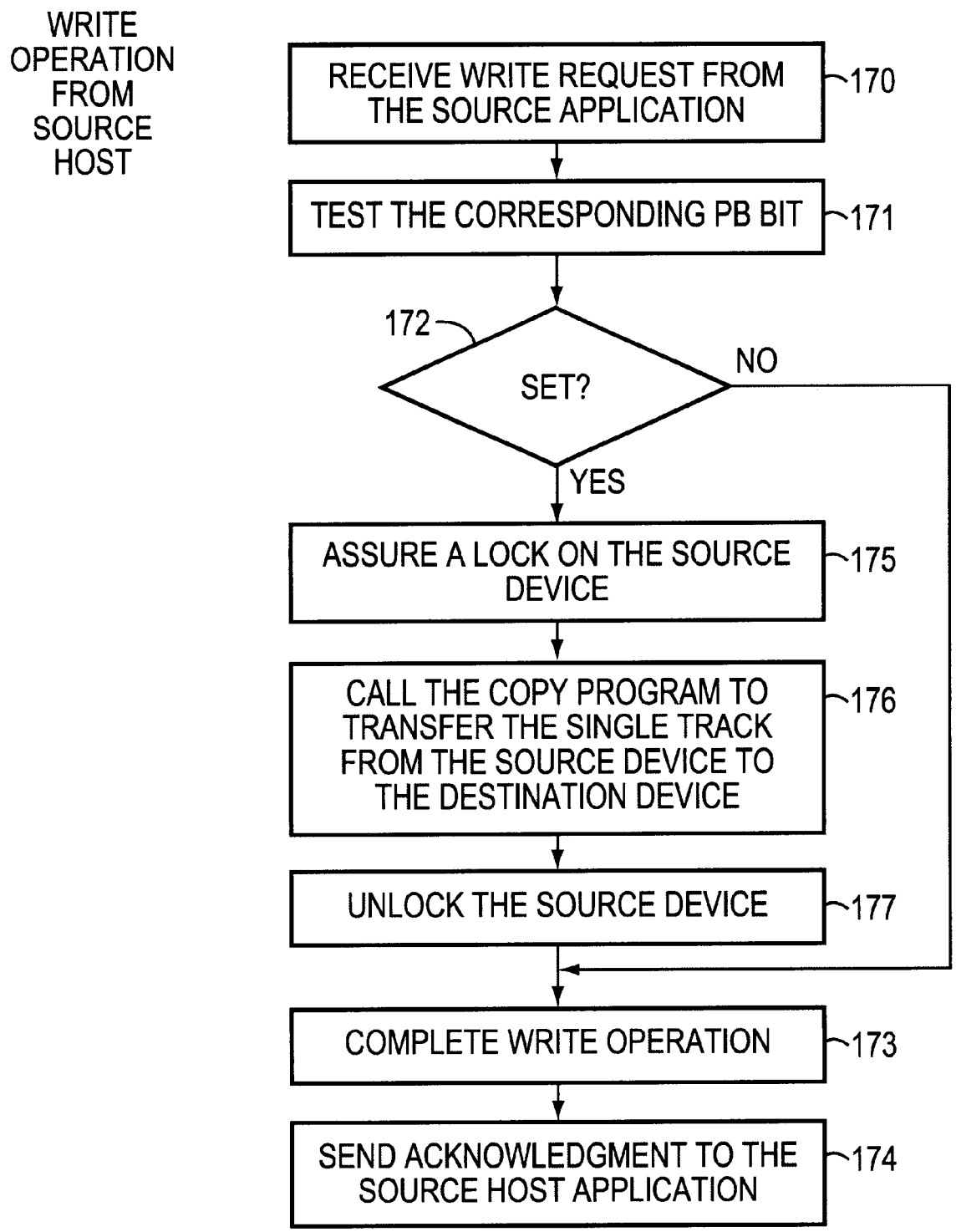
FIG. 9 depicts the response of the system to a write request to a predetermined source storage location.
Figure 10:
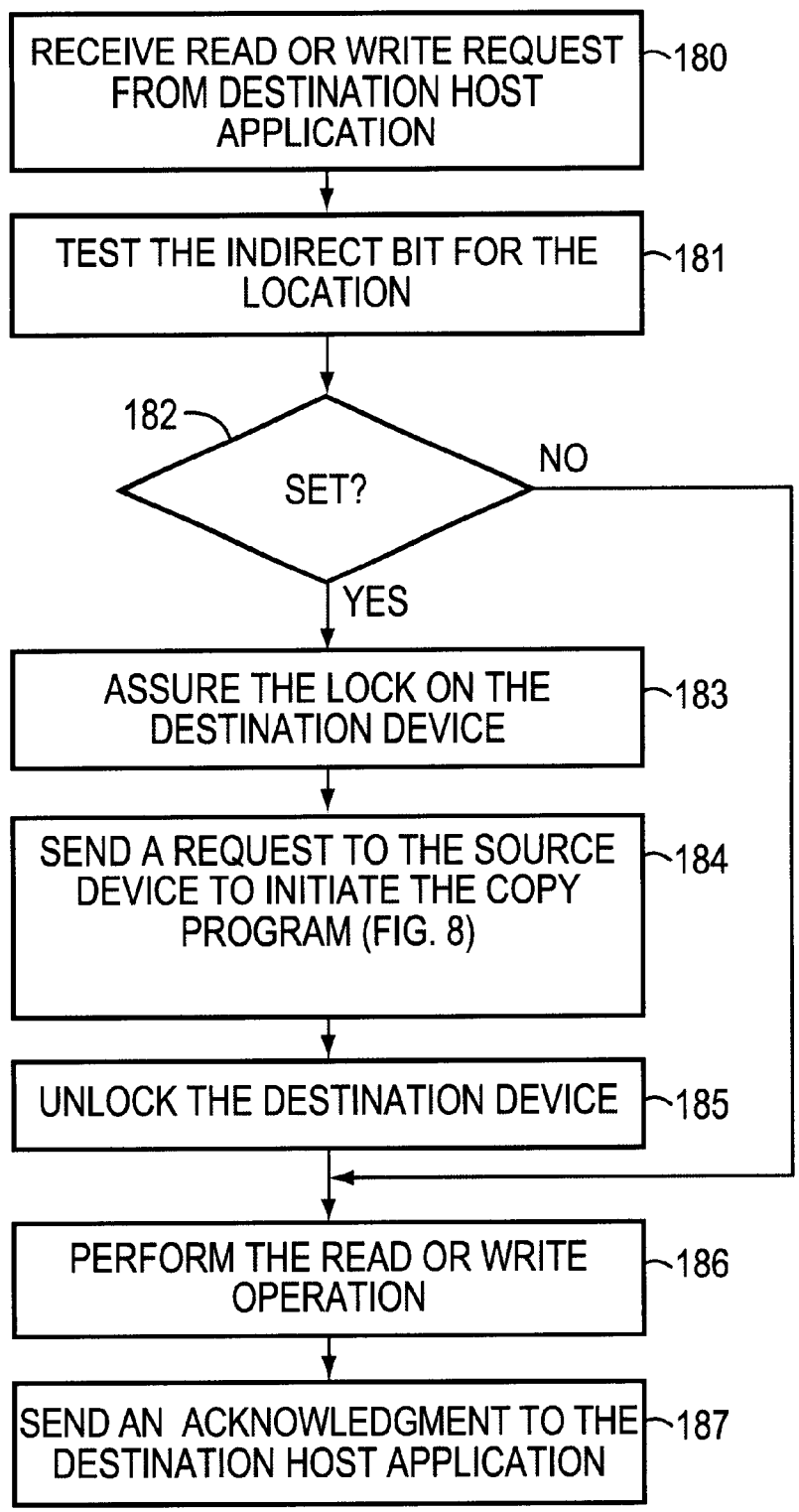
FIG. 10 depicts a response to read and write requests to a predetermined destination storage location.

FIGS. 5 through 9 disclose the steps and procedures conducted during the first operating phase; FIGS. 8 through 10, the second operating phase; and FIGS. 11 and 12, the third operating phase. For purposes of attaining an understanding of this invention, it will be helpful to describe initially the invention in terms of a transfer of the file 36 to storage locations 40 in FIG. 1 and thereafter to disclose alternate copying procedures of increasing complexity.

Figure 5:
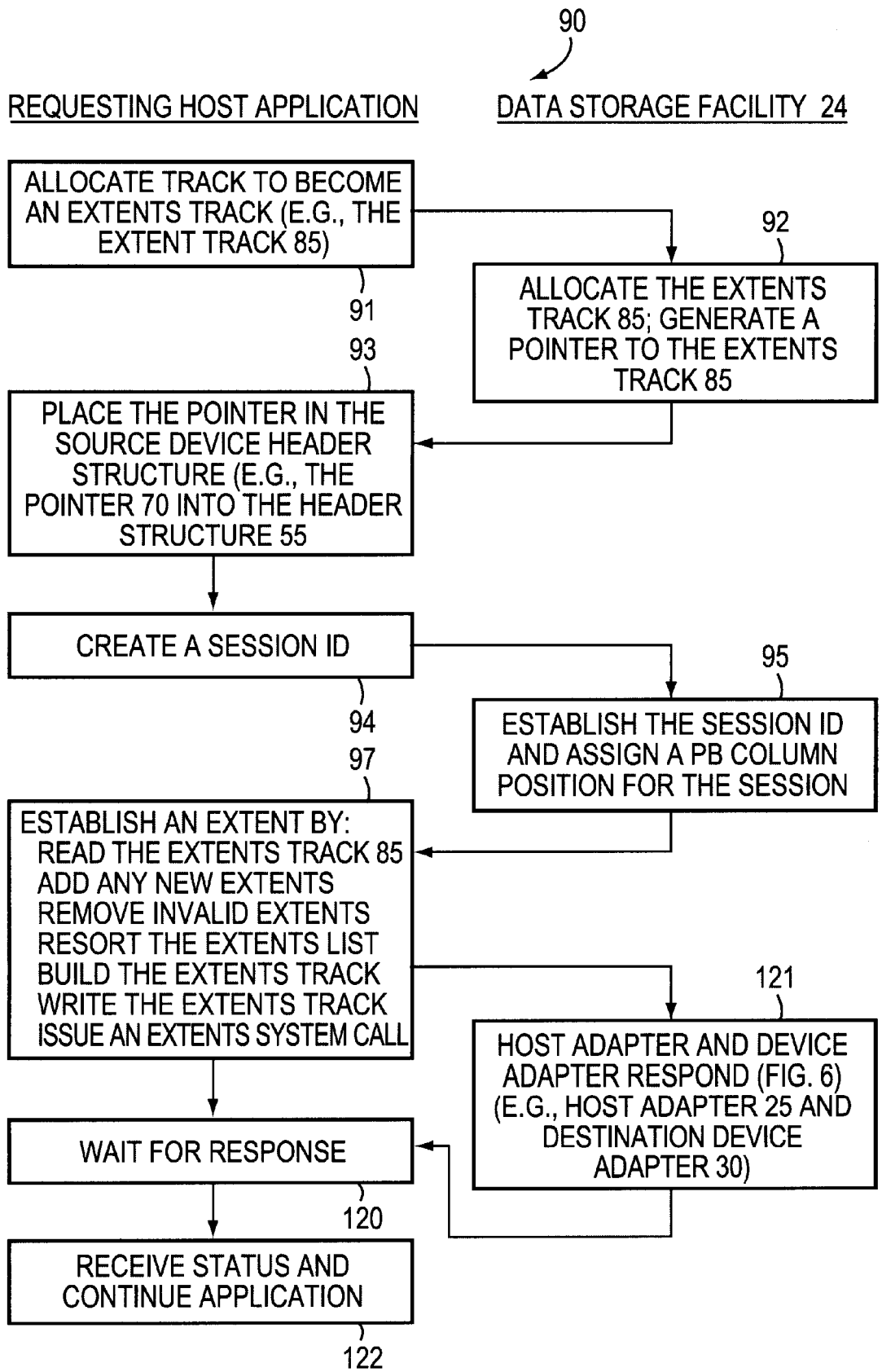
FIG. 5 depicts an interaction between a host array and data storage facility by which the copying occurs.

When a requesting host application seeks to copy the file 36 to the storage locations 40, the requesting host application initiates a process 90 in FIG. 5 to interact with the data storage facility 24, particularly the host adapter controller and the device controller associated with the source, such as the controller 86 in the host adapter 26 and the controller 87 in the disk adapter 30 that is designated a source device. In step 91, the requesting host application allocates a track as an extents track. The controller 87 uses step 92 to allocate that extents track and generates a pointer to that track that is transferred back to the requesting host application. Step 93 in the requesting host application places the pointer in the source device header structure, such as the block 70 in the header 55 for the source device 31 as shown in FIG. 2.

In step 94 the requesting host application begins a process for creating a session ID. A host adapter controller, such as the controller 86 in the host adapter 26, responds in step 95 by establishing that session ID number. More specifically, there is associated with each Track ID Table a data block for containing protection bits. The data block can be considered as a two-dimensional array with one row for each track and one column for each session. In the Symmetrix disk array storage systems, each row is 2 bytes wide to define up to 16 sessions. This array is located as PB header 96 on each Track ID table. In the following discussion a particular PB bit position will be identified in the form PB(x,y) where x indicates a track in a cylinder and y indicates a session number. During the session creation in step 95, the controller 87 determines whether any "y" column is available. If one is available, the controller 87 establishes a session identification correlated to the selected PB bit column. This assignment is applied to each PB header 96 associated with the source and destination devices. Establishing separate sessions will enable multiple copying operations to be processed in parallel even with overlapping areas, as for example if it should be desired to copy the file 36 to the DEST A destination device 33 and to copy another subset of data including the file 36 to another destination device.

After a session has been established and the PB column bit has been determined, control passes back to step 97 wherein the requesting host application establishes an extents track. First, the requesting host application reads the extents track, such as the extents track 85 assigned to this particular session. In an initial stage, the extents track will have no data. However, as will become apparent, the process of step 97 can be repeated during a given session. Consequently, step 97 performs various housekeeping operations such as adding any new extents required by the new command or eliminating any as previously defined extents that are no longer valid.

Next the requesting host application resorts the extents list. In the specific implementation, the extents lists includes addresses in a the cylinder-block-head format as a sort field. Consequently the list is ordered by cylinder and by track for the most efficient transfer of data with a minimal requirements for seek operations. Step 97 then builds the extents track according to the structure shown in FIG. 3.

Now referring to FIG. 3, the header 76 in the extents track includes a lock status entry 100 that indicates whether the extents track is locked. In a multiple host environment an SMFID entry 101 identifies the host application that generated or last updated the extents track 75. Entry 102 identifies the number of extents buffers 77 that are included in the extents track 75. Block 103 identifies the source device, such as the source device 31 in FIG. 1. A password entry 104 enables a host source or destination device to verify requests. A TOD field 105 contains the time at which the extents track was formed. This information is available for use by a host application. A field 106 identifies a first extent that is always 0 to indicate the first record in a track in one embodiment. A last extent entry 107 identifies the last used extent relative to the extent in the first extent entry 106. A PB offset vector entry 108 contains a number of entries that identify the first and last extent elements or buffers for a particular session. Other entries are also included in the header 75, but they, like the entries 101 and 105 provide control information for the host operations and are not relevant to this invention.

Each extents track, such as extents track 75 in FIG. 3, also includes one or more extent buffers, such as the extents buffer 77. In the case of a requesting host application command for transferring the file 36 in source device 31 to the locations 40 in the DEST A device 33, only one extents buffer 77 is included in the extents track. This extents buffer 77 includes a certain amount of information including, from the standpoint of this invention, a source starting location 110. In this particular implementation this is the starting location in the cylinder-block-header address format. Entry 111 includes the number of tracks that will be involved in the copy operation for the extent; that is, the total number of tracks for file 36. A protection bit offset entry 112 identifies the specific PB column position to be monitored for the session.

Each extents buffer 77 includes a flags field 113 including a NEW EXTENT flag that is set when the extents track is initially written; a REMOVE EXTENT flag that is set when it is desired to remove a specific extent; and an INVALID EXTENT flag that is set by the source device controller. The flags field 113 will contain other flags used for purposes that are not relevant to this specific invention.

Entries 114 and 115 collectively define the destination device. Specifically, entry 115 defines the destination device number while entry 114 defines the initial location of the storage locations 40 in the DEST A device 33. Entry 116 stores the session ID and entry 117 contains an EXTENT CRC code for all the preceding bytes in the extents buffer 77.

Referring again to FIG. 5, once step 97 builds the extents tracks, it writes the extent track to the track 85 and then issues an establish extents system call for transfer to the data storage facility 24. After this occurs the requesting host application enters a wait state represented by step 120.

While in the wait state 120, the data storage facility 24, and particularly the destination device controller 88 responds to establish the environment and initiate the copy operation all as shown in FIG. 6. Once this process is completed in step 121, a status is returned to the requesting host application. Step 122 in FIG. 5 receives the status and enables the requesting host application to continue its operation, that may or may not include generating an I/O request to either file copy. For example, the requesting host application could access the file 36 or its copy in the DEST A device 33 at locations 40. Alternatively, the requesting host application may enable a second application, such as the HOST APP B application 23, to access the copy in the destination device such as the copy locations 40 in the DEST B device 33.

When the host adapter in the data storage facility 24, such as the host adapter 26, receives an establish extents system call, the destination device controller, such as the destination device controller 88, receives the system call and verifies various parameters in step 123 of FIG. 6. Such verification might include determining that the first address is a valid address and is the same address as might be recorded in the device header, particularly the device starting location 114 in FIG. 3. Any of a number of other tests may also be performed to verify the context and content of the system call.

Assuming verification, control passes to step 124 wherein the host adapter locks the destination device such as the DEST A device 31. In step 125 the host adapter controller 86 places an ATTN signal in a request buffer for the source device, such as an ATTN flag in the request buffer 72 shown in FIG. 2. Step 126 forms the request record for effecting the data transfer to the destination device. The request record has the data structure shown in FIG. 4 and includes the source device number in block or field 81, the record number of the starting extent in block or field 82 and the record number of the ending extent in block or field 83.

Control then passes to a procedure 127 shown in FIG. 7. If the destination device has mirrored physical devices, a procedure, not described in detail, but known in the art, assures that all the related mirror devices are inactive. Step 130 selects and locks the corresponding extents track in step 130 so that no additional changes may be made to that extents track. For each track in the destination device, step 131 performs a number of functions. First, it uses the values in the header 61 to determine that the header 61 is associated with a destination device and that an indirect (IND) bit position 132 in each track associated with the destination device is cleared. Then for every destination track step 131 sets that IND flag and sets an indirect address, that is the address of the track in the source device to be copied, to a cache pointer. If there are any pending write operations to the device, they are cleared. More specifically, this implementation of the invention assumes that the requesting host application will take no action to destroy data integrity. With this assumption, any write pending operations are irrelevant because they would be replaced by the copied file. Clearing the write pending flag assures that no such data will overwrite the copied file track. Any in-cache (IC) flag 133 that is set in each destination track is cleared. At this point the system may set a write pending bit to effect a transfer of the extents track to the source device 31.

Once all this information has been transferred to the track ID tables associated with the destination device, the protection bits in the session column are set for each track on the entire extent in step 135 for the source device. Step 136 resets the NEW EXTENT flag in the flags field 113 shown in FIG. 3. The CRC field is then updated in step 137 and the extents track, such as the extents track 75, is set to be write pending in step 132. The destination device controller 88 uses step 140 to unlock the extents track that was locked in step 130. Thereafter another establish extents track system call can alter the extents track. In step 141 the destination device controller 88 sends an acknowledgement to the disk adapter 30 associated with the source device 31. Step 142 cancels the request generated in step 126 of FIG. 6.

Control then passes back to step 143 in FIG. 6 that unlocks the destination device. The host adapter controller 86 then sends status to the host in step 144 and reconnects the source device to the host application, such as the source device 31 to the HOST A APP application 22.

As will now be apparent, the steps of FIGS. 6 and 7 do not produce the physical transfer of any data. Nevertheless, when the destination device is unlocked in step 143 and the source device is reconnected in step 145, any host application can alter the file in the source device 31, such as the file 36 and any other application can access data in the file copy stored in locations 40 of the DEST A device 33.

FIG. 8 depicts the operation of the copy program 84 shown in FIG. 1. In step 150 the source device controller 87 reads the extents track, such as the extents track 75 in FIG. 3. Step 151 uses the data from the extents track 75 to obtain the location of the initial destination track and step 152 identifies the destination device so these two items specifically locate the first destination track within the data storage facility 24 in FIG. 1.

Step 153 is the first step in a loop that tests the IND flag for each track for the defined extent in the destination device, such as the IND flags 132 in the Track ID Table 63 in FIG. 2. This test determines whether it is necessary to copy a specific track from the source to the destination. As will become apparent later in this description, it is possible for other activity to have effected a transfer of an individual track. If the data in the track has not been transferred from the source device to a destination device, step 154 transfers control to step 155 that copies that track, such as from a track in the source device 31 to a corresponding or predetermined track in the DEST A destination device 33. Step 156 clears the IND bit 132 in the destination device and step 157 clears the corresponding PB bit in the header 96 for the track in the source device 31.

Clearing the IND flag assures that an application processing that track in the destination device will not try to copy the track; clearing the PB bit in the source device assures that the track will not be copied if a host application accesses that track in the source device 31. If there are additional tracks to be processed in step 160 control passes to step 161 to identify a next track and the control returns to step 153.

If step 154 determines that the IND bit is not set, no copying occurs and control passes directly to step 160. When all the tracks have been identified in sequence, it is considered that the extent has been transferred and the copy program terminates.

As previously indicated, the second operating phase insures data integrity during the copying process even though a host application can access the source device file 36 or the destination device file 40 before data is actually copied. FIG. 9 depicts the response to a write request from an application, such as occurs when the HOST APP A application 21 write to the file 36 in source device 31. Read requests are processed in a conventional form as they do not alter the data. For a write request, the host adapter 26 passes the write request to the source disk adapter, such as the source disk adapter 30 for a write to the file 36. The controller 87 receives that request in step 170 and tests the corresponding PB bit associated with the source device in step 171, such as the PB bit in the corresponding header 96 of the source Track ID Table 56. The PB bits in a given column collectively correspond to all the tracks in the device. However, the set bits in a column will identify those files, or other data subsets, that are to be copied. Thus, the PB(s) bit positions constitute a list of the predetermined source storage locations in the source device. Similarly, the IND bit positions in the destination device Track ID Table provide a list of the predetermined destination storage locations in the destination device.

During a normal operation, if a PB bit in the source device Track ID Table, such as the Track ID Table 56 in FIG. 2, is cleared, the track is either not in the extent or already has been transferred so step 172 diverts to step 173 either in the extent or to complete the write operation in a normal fashion. Step 174 then sends an acknowledgement to the host application that issued the write request, such as the HOST APP A application 22 in FIG. 1.

If the PB bit for a track is set, the track is included in the file and still needs to be transferred, so step 172 transfers control to step 175. Step 175 assures that there is a lock on the source device and uses step 176 to call the copy program of FIG. 8 identifying the single track being written from the source host application. The copy program in FIG. 8 then responds by writing that single track from the source device to the destination device and by clearing the PB(s) bit in the Track ID tables for the source device and the corresponding IND for the destination device. When the copy program completes this one-track transfer, step 177 unlocks the source device so it is again immediately available to any application. Thus FIG. 9 depicts a process for insuring data integrity when a write request to the source file being transferred is received from a host application.

FIG. 10 depicts the operation that occurs when a host application, such as the HOST APP B application 23, as a destination host application seeks to access the destination device, such as the file copy 40 in the DEST A device 33. A controller in the destination device, such as the controller 88 in the DEST A destination device 33, receives read and write requests from the destination host application in step 180. Then the controller 88 uses step 181 to access the corresponding destination device track ID table, such as the track ID table 64, to test the IND bit in the bit position 132. The IND bit position was set if the destination track is part of an extent during the establishment at step 131 in FIG. 7.

If the IND bit is set, it is necessary to immediately perform operations to assure that, in the case of a read request, the data is current or, in the case of a write request, the copy program operating in its normal mode does not overwrite new data. Thus, step 182 transfers control to step 183. Step 183 assures a lock on the destination device. Step 184 then sends a request to the source device to initiate the copy program such as the copy program 84 in the source device disk adapter 30 for the file 36. This request has the basis structure shown in FIG. 4. However, as the request originates in a destination device, the field 81 contains the destination device number and the fields 82 and 83 contain cylinder address and head identifications for the destination device. When that, single track has been copied, step 185 unlocks the destination device.

If the IND bit for a track is cleared, the track either is not in an extent or has already been copied. When the condition exists, step 182 transfers control to step 186, bypassing steps 183, 184 and 185. Step 186 then performs the read or write operation and sends an acknowledgement to the destination host application in step 187.

Figure 11:
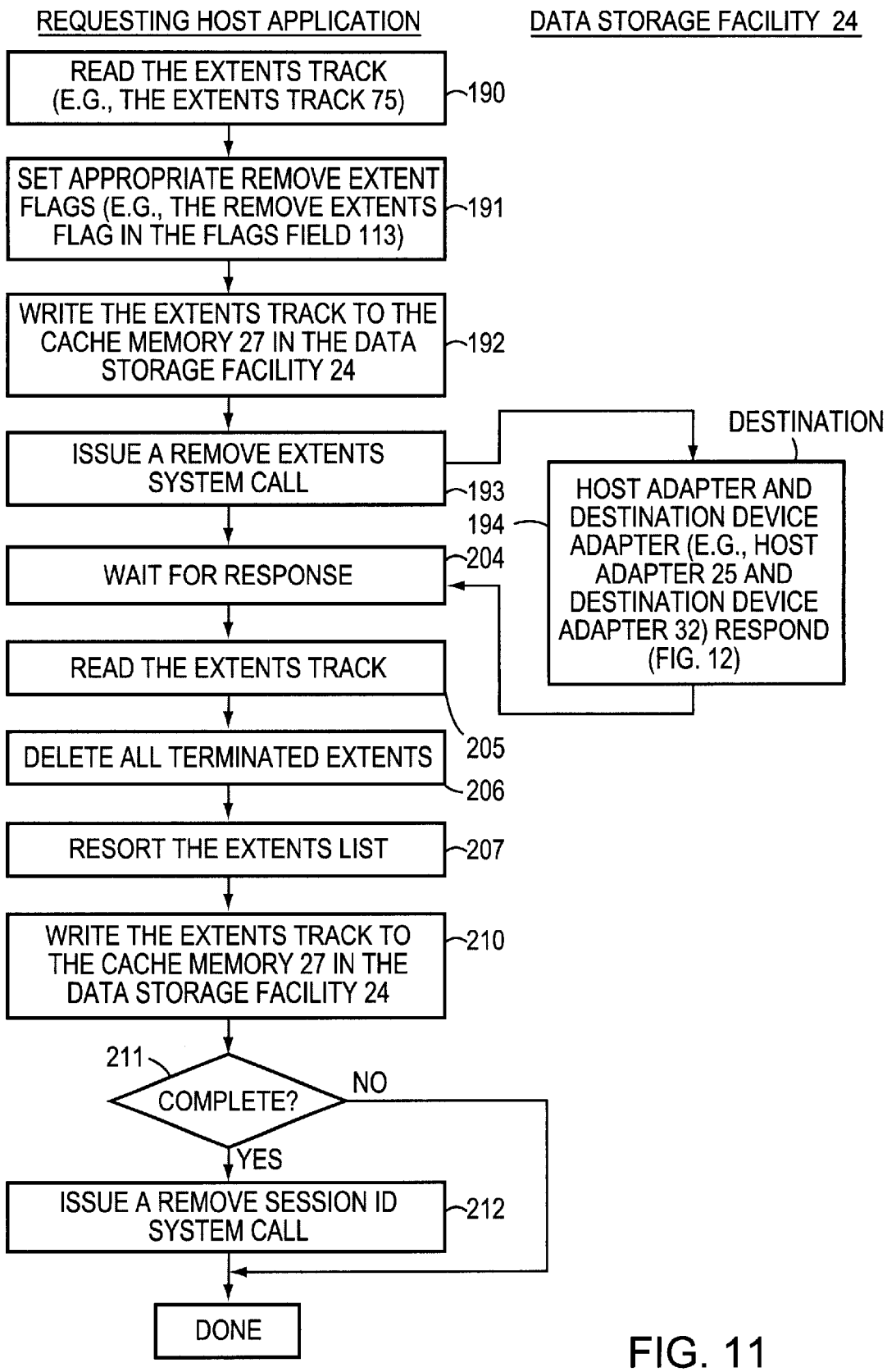
FIG. 11 is a flow diagram of a procedure for removing an extents track.

Now referring to the termination/modification phase, FIG. 11 depicts a process for removing an extents buffer from an extents track. First, a requesting host application uses step 190 to read the extents track, such as an extents track 75 in FIG. 2. Next the requesting host application sets the REMOVE EXTENT flag in the corresponding extents buffer, such as found in the flags field 113 of FIG. 3. When this is complete, step 192 writes the extents track to the cache memory 27. Then the requesting host application issues a REMOVE EXTENTS system call in step 193.

The host adapter and destination device adapter, such as the host adapter 25 and the destination device adapter 30, respond. Initially the host adapter uses the same process that is depicted in steps 123 through 126 in FIG. 6 and sends the request record to the destination device adapter that responds as shown in FIG. 12.

Figure 12:
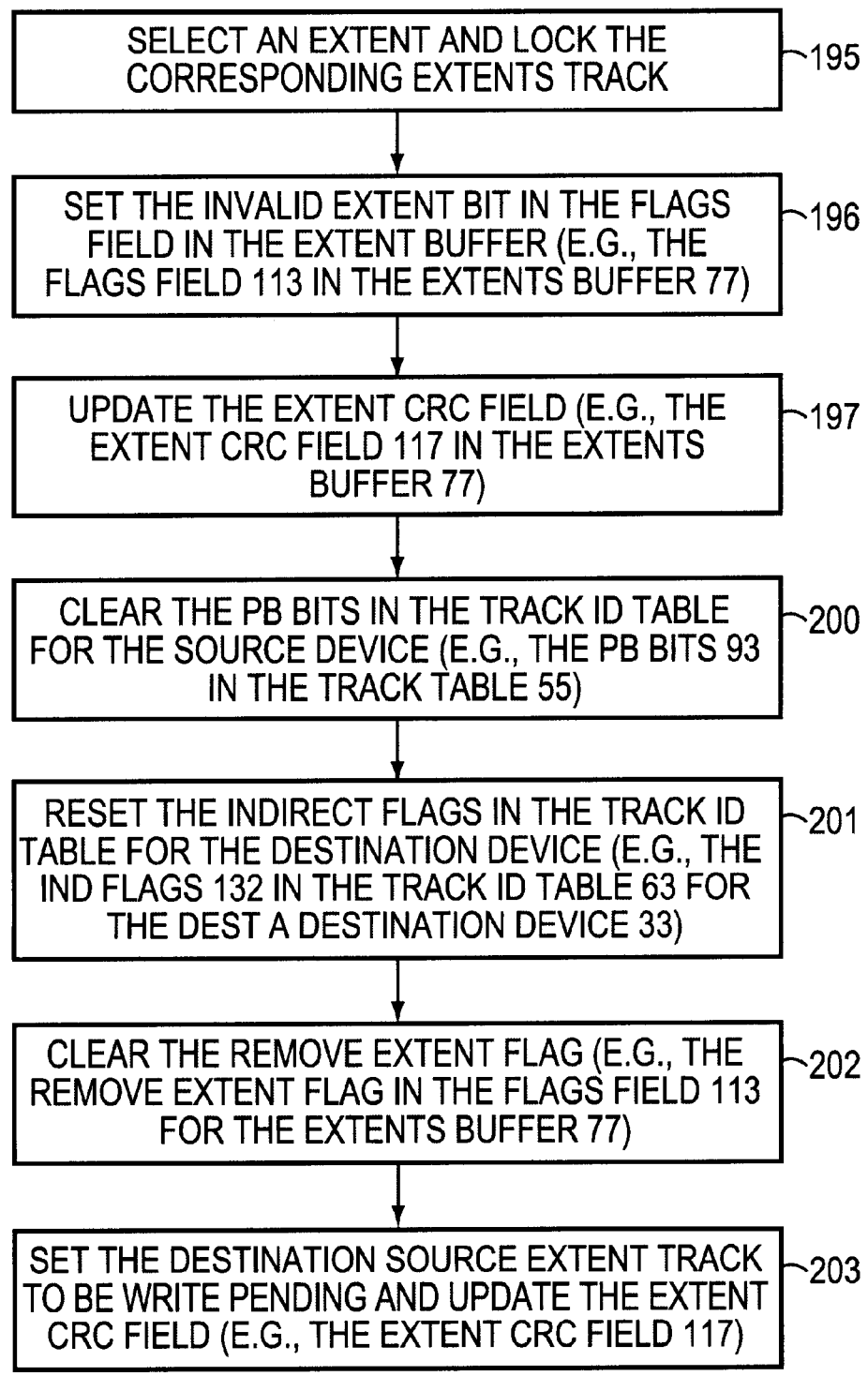
FIG. 12 is a more detailed flow diagram of a portion of the process depicted in FIG. 11.

Referring to FIG. 12, step 195 selects an extent and locks the corresponding extents track so no other application can alter that extents track. Step 196 sets the INVALID EXTENT bit in the flags field for the corresponding extent buffer, such as the INVALID EXTENT flag in the flags field 113 shown in FIG. 3. Step 197 updates the EXTENTS CRC field to maintain data integrity. In step 200 the destination device adapter clears all the PB bits for the source device, such as the PB header 96 with the Track ID table 55 in FIG. 2. Step 201 resets all the IND flags in the Track ID table for the destination device. In the specific example this involves setting the IND flags 132 in the Track ID table 63. In step 202 the controller 88 in the destination disk adapter 30 clears the REMOVE EXTENT flag, such as the REMOVE EXTENT flag in the flags field 133, for the extents buffer 77. Step 203 sets the source extent track to a write pending state to produce an updated copy on the source device 31 and updates the EXTENT CRC field such as the EXTENT CRC field 117 in FIG. 3.

Once the procedure in FIG. 12 is complete, a response is sent to the requesting host that is in wait state represented by step 204 in FIG. 11. This response allows the requesting host application to read the extents track in step 205 for further housekeeping or processing. In step 206 the requesting host application deletes all terminated extents and then resorts the extents list in step 207 as previously described. Step 210 writes the updated extents track to the cache memory 27.

Step 211 determines whether the process is complete. That is, the source device controller 87 tests to determine if all the INVALID EXTENT flags, such as the invalid extent flag in the flags field 113 for the extents buffer 77, have been set. If they have, step 211 diverts to 212 to issue a remove session ID system call before completing operations. Otherwise the process in FIG. 11 terminates without issuing the system call, so the session under which the copy was performed remains active.

Although not shown in a figure, the remove session ID system call for a particular device clears all the PB bits from the associated extents, such as the PB bits in the column position assigned to the session for the source device and makes that PB column or session position available for other uses.

The foregoing discussion describes an operation by which a single file in a single set of contiguous data tracks in a source device are transferred to a contiguous set of tracks in a destination device particularly between the file 36 in the source device 31 and the storage locations 40 in the DEST A destination device 33. There are a wide variety of other transfer variations that can be implemented with this same approach. Indeed it is the foregoing structure and operations that permit more complex data transfers to be made.

For example, file 37 in FIG. 1 is shown as being in two sets of contiguous data track locations, namely locations 37A and 37B. As the file 37 is in a single source device, the establishment of the extents shown in FIGS. 5 through 7 will produce an extents track in the format of FIG. 5 that contains a header, such as the header 76, and two extents buffers 77. The first extents buffer would identify the starting location for the contiguous track 37A and the number of tracks in that set in field corresponding to fields 110 and 111 in FIG. 3. The second extents buffer would include the starting location for the contiguous track 37B and the number of tracks in that contiguous set corresponding to fields 110 and 111. A destination starting location, such as the destination starting location 114, would include the starting track location for the locations 40 in the first extents buffer 77 and a number offset from that starting location by the number of tracks in the first extent for the extents buffer associated with this second set of contiguous tracks.

It is also possible for a single copy command or a succession of copy commands to request the transfer of the file 36 to storage locations 40 and the file 37 to storage locations 41. In this case the establishment of the extents track will again produce a single extents track because both the files 36 and 37 are in non-overlapping locations in the same source device. In the particular embodiment shown in FIG. 1 the extents track 75 will then contain three extents buffers. The first extents buffer will include the information for transferring the file 36 to storage locations 40; the second and third extents buffers, the information for transferring contiguous track sets 37A and 37B to their respective positions and storage locations 40.

Transfers can also be effected within a single session. For example, supposing that in addition to transferring the files 36 and 37 to storage locations 40 and 41 in FIG. 1, it is also desired to transfer a file in storage locations 230 to storage locations in the device 33 to storage locations 231 in the device 35. If this process is defined in a single extents track establishment, the device headers 43 will be modified as shown in FIG. 2 by adding another source device entry for the device 33 identifying the file 230. That new source device will include an extents track that identifies the storage locations 230 and the destination storage locations 231. Thus in this particular embodiment, the logical device 33 acts both as a destination device for receiving the file 36 and as a source device for the file 230 and, as a result of implementing this invention, this more complex transaction still can occur within a single session.

As previously indicated a single session can effect as many transfers as desired limited normally by the space available or assigned for the device headers. However, a single session can not be used to transfer files in which data overlaps. For example, in FIG. 1 if it were desired to transfer file 36 both to storage locations 40 in the DEST A device and storage locations 41 in the DEST B device 35, an overlap would exist. If the extents on a source overlap, different sessions must be used. In such situations separate sessions are used and separate PB column positions will be assigned to resolve any ambiguity in the transfers.

Thus, this invention provides a method that is particularly adaptable for use in data storage facilities that normally transfer data of a given coarse granularity such as transfers by entire logical volumes. Specifically, this invention allows subsets of that data to be moved thereby eliminating the transfer of irrelevant data. In addition, this invention allows these transfers to occur with minimal interruptions to other host applications. As described, the host application is merely dedicated for the purpose of establishing an operating environment for the transfer. Once that environment has been established, normally within a few milliseconds, a requesting host application is enabled to continue with other processes. It is not prevented from continuing while the actual transfer occurs. Reenabling the application to continue enables access by applications to either the file at the source or the file copy at the destination. During the copying process possible transfers involving those locations can occur. The system provides means for updating those transfers to preserve data integrity. Moreover, the method permits a host application to define a range of copy requests that have a range of complexities from a single file to single destination to copying requests that involve multiple files located on multiple physical devices in a data storage facility.

The specific description of this invention has been in terms of a particular implementation with a specific data storage facility configuration. Specific flags such as IND flags, have been defined. FIGS. 5 through 12 disclose specific operating sequences. It is understood that the definition of these flags and operating sequences may be altered and others may be eliminated depending upon the configuration and capacities of a particular data storage facility with the attainment of some or all of the objectives of this invention.

It will be apparent that the foregoing and many other modifications can be made to the disclosed system without departing from the invention. Moreover, the disclosed system is disclosed as an example of a data handling system involving a host and a particular data storage facility. It will be apparent to those of ordinary skill in the art that the basic elements of this invention may be implemented in a wide variety of localized and network environments. Therefore, it is the intent of the appended claims to cover all such variations and modifications as come within the true spirit and scope of this invention.

What is claimed as new and desired to be secured by Letters Patent of the United States is:

1. In a data processing system including a host device for generating commands during the processing of a host application, a method for copying data from predetermined source storage locations to predetermined destination storage locations in response to a command from a host application identifying the predetermined storage locations, said method comprising the steps in sequence of:
   A) establishing an operating environment by generating a list of the predetermined source storage locations and a list of the predetermined destination storage locations,
   B) making the source and destination storage locations available for use by host applications, and
   C) copying the data from the predetermined storage locations in an ordered manner including, for each predetermined storage location:
      i) copying the data from the predetermined source location to the predetermined destination location, and
      ii) updating the lists to indicate that the data has been transferred.

2. A method as recited in claim 1 additionally comprising the step of deleting the operating environment after said copying has been completed.

3. A method as recited in claim 2 wherein a host application generates a write request to an identified source storage location during said ordered copying, said method including the steps of:
   i) interrupting said ordered copying in response to the request,
   ii) copying data in the source storage location to a corresponding destination storage location, and
   iii) re-enabling said ordered copying upon completion of said data copying.

4. A method as recited in claim 2 wherein a host application generates one of read and write requests to an identified destination storage location during said ordered copying, said method including the steps of:
   i) interrupting said ordered copying in response to the request,
   ii) copying data from a source storage location corresponding to the identified destination storage location, and
   iii) re-enabling said ordered copying upon completion of said data copying.

5. A method as recited in claim 2 wherein data is stored in the data storage facility in first blocks of a first granularity and normally is copied in blocks of a second, coarser granularity and wherein said source and destination storage locations are located in source and destination devices, respectively, said method enabling the copying of third blocks of an intermediate granularity wherein:
   i) said first list generation for the source storage locations includes generating a list of all the first blocks included in a second block for the source device with an indication of whether each first block is in the third block, and
   ii) said second list generation for the destination storage locations includes generating a list of all the first blocks included in a second block for the destination device with an indication of whether each first block is to receive a third block from the source device.

6. A method as recited in claim 5 wherein a host application generates a write request to an identified first data block in the source storage locations during said ordered copying, said method including the steps of:
   i) interrupting said ordered copying in response to the request,
   ii) copying the data in the identified first block of the source storage location to the identified first data block in the destination storage location,
   iii) clearing the corresponding first block indications in the first and second lists, and
   iv) re-enabling said ordered copying upon completion of said data copying.

7. A method as recited in claim 5 wherein a host application generates one of read and write request to an identified first data block in the destination storage locations during said ordered copying, said method including the steps of:

i) interrupting said ordered copying in response to the request, ii) copying the data in the identified first block of the source storage location to the identified first data block in the destination storage location, iii) clearing the corresponding first block indications in the first and second lists, and iv) re-enabling said ordered copying upon completion of said data copying.

8. A data storage facility that connects to a host device that generates input-output commands during the processing of a host application wherein said data storage facility is adapted for copying data from predetermined source storage locations to predetermined destination storage locations in response to a predetermined command from a host application identifying the predetermined storage locations, said data storage facility comprising:

A) means responsive to the predetermined command for establishing an operating environment by generating a first list of the predetermined source storage locations and a second list of the predetermined destination storage locations, B) means for enabling interaction of input-output commands with the source and destination storage locations, C) means for copying data from each predetermined source storage location to the predetermined destination storage location in an ordered manner, and D) means responsive to said copying means for updating said first and second lists to indicate that the data has been transferred.

9. A data storage facility as recited in claim 8 additionally comprising means for deleting the operating environment after said copying means completes the copying operation.

10. A data storage facility as recited in claim 9 wherein a host application generates a write request to an identified source storage location during said ordered copying and said ordered copying means includes:

i) a copy program, ii) means for operating said copy program in an ordered copying mode, iii) means for interrupting said ordered copy operating means in response to a write request and enabling said copy program to copy data in the identified source storage location to a corresponding destination storage location, and iv) means for re-enabling said ordered copy operating means upon completion of said data copying.

11. A data storage facility as recited in claim 9 wherein a host application generates one of read and write requests to an identified destination storage location during said ordered copying, and said ordered copying means includes:

i) a copy program, ii) means for operating said copy program in an ordered copying mode, iii) means for interrupting said ordered copy operating means in response to any of the read and write requests to the identified destination storage location and enabling said copy program to effect a transfer from a source storage location corresponding to the identified destination storage location, and iv) means for re-enabling said ordered copy operating means upon completion of said data copying.

12. A data storage facility as recited in claim 9 wherein data is stored in first blocks of a first granularity and normally is copied in blocks of a second, coarser granularity and wherein said source and destination storage locations are located in source and destination devices, respectively, and wherein said operating environment establishing means comprises:

i) first list generating means for generating a list of all the first blocks included in a second block for the source device with an indication of whether each first block is in a third block of intermediate granularity, and ii) said second list generating means for generating a list of all the first blocks included in a second block for the destination device with an indication of whether each first block is to receive a third block from the source device whereby said data storage facility is adapted for copying data blocks of the intermediate granularity.

13. A data storage facility as recited in claim 12 wherein a host application generates a write request to an identified source storage location during said ordered copying and said ordered copying means includes:

i) a copy program, ii) means for operating said copy program in an ordered copying mode, iii) means for interrupting said ordered copy operating means in response to a write request and enabling said copy program to copy data in the identified source storage location to a corresponding destination storage location, and iv) means for re-enabling said ordered copy operating means upon completion of said data copying.

14. A data storage facility as recited in claim 9 wherein a host application generates one of read and write requests to an identified destination storage location during said ordered copying, and said ordered copying means includes:

i) a copy program, ii) means for operating said copy program in an ordered copying mode, iii) means for interrupting the ordered copy operating means in response to any of the read and write requests to the identified destination storage location and enabling said copy program to effect a transfer from a source storage location corresponding to the identified destination storage location, and iv) means for re-enabling said ordered copy operating means upon completion of said data copying.

15. In a system including a processor device for generating commands during the processing of an application, a method for copying data from predetermined source storage locations to predetermined destination storage locations in response to a processor device command identifying the predetermined storage locations, said method comprising the steps in sequence of:

A) identifying the predetermined source storage locations and identifying the predetermined destination storage locations, B) making the source and destination storage locations available for use by a processor device, and C) copying data from each predetermined source storage location to the predetermined destination location in an ordered manner, and D) updating the corresponding source and destination storage locations identifications to indicate that the data has been transferred.

16. A method as recited in claim 15 additionally comprising the step of deleting the identifications after said copying has been completed.

17. A method as recited in claim 16 wherein a host processor device generates a write request to an identified source storage location during said ordered copying, said method including the steps of:
   i) interrupting said ordered copying in response to the write request,
   ii) copying data in the source storage location to a corresponding destination storage location, and
   iii) re-enabling said ordered copying upon completion of the data copy.

18. A method as recited in claim 16 wherein a host processor device generates one of read and write requests to an identified destination storage location during said ordered copying, said method including the steps of:
   i) interrupting said ordered copying in response to the request,
   ii) copying data from a source storage location corresponding to the identified destination storage location, and
   iii) re-enabling said ordered copying.

19. A method as recited in claim 16 wherein data is stored in the data storage facility in first blocks of a first granularity and normally is copied in blocks of a second, coarser granularity and wherein said source and destination storage locations are located in source and destination devices, respectively, said method enabling the copying of third blocks of an intermediate granularity wherein:
   i) said first list identification of the source storage locations includes generating a list of all the first blocks included in a second block for the source device with an indication of whether each first block is in the third block, and
   ii) said second list identification of the destination storage locations includes generating a list of all the first blocks included in a second block for the destination device with an indication of whether each first block is to receive a third block from the source device.

20. A method as recited in claim 19 wherein, in response to a write request to an identified first data block in the source storage locations during said ordered copying, said method:
   i) interrupts said ordered copying,
   ii) copies the data in the identified first block of the source storage location to the identified first data block in the destination storage location,
   iii) clears the corresponding first block indications in the first and second lists, and
   iv) re-enables said ordered copying.

21. A method as recited in claim 19 wherein, in response to one of read and write requests to an identified first data block in the destination storage locations during said ordered copying, said method:
   i) interrupts said ordered copying,
   ii) copies the data in the identified first block of the source storage location to the identified first data block in the destination storage location,
   iii) clears the corresponding first block indications in the first and second lists, and
   iv) re-enables said ordered copying.

22. In a system including at least one host processor device that generates input-output commands, apparatus for copying data from predetermined source storage locations to predetermined destination storage locations in response to a predetermined one of the commands identifying the predetermined storage locations, said apparatus comprising:
   A) first identifications of the predetermined source storage locations and second identifications of the predetermined destination storage locations,
   B) means for enabling interaction of the input-output commands within the source and destination storage locations, and
   C) means for copying data from the predetermined storage locations to the predetermined destination locations in an ordered manner, and
   D) means responsive to said copy means for updating the first and second identifications to indicate that the data has been transferred.

23. A system as recited in claim 22 additionally comprising means for deleting the first and second identifications after the said copy means completed the copy operation.

24. A system as recited in claim 23 wherein said ordered copying means includes:
   i) means responsive to a write request to an identified source storage location of interrupting the operation of said ordered copying means,
   ii) means for copying data in the identified source storage location to a corresponding destination storage location, and
   iii) means for re-enabling said ordered copying.

25. A system as recited in claim 23 wherein said ordered copying means includes:
   i) means responsive to one of read and write requests to an identified destination storage location during said ordered copying interrupting the operation of said ordered copying means,
   ii) means for copying data from a source storage location corresponding to the identified destination storage location, and
   iii) means for re-enabling said ordered copying means.

26. A method as recited in claim 23 wherein data is stored in first blocks of a first granularity and normally is copied in blocks of a second, coarser granularity and wherein said source and destination storage locations are located in source and destination devices, respectively and wherein said method enabling the copying of third blocks of an intermediate granularity wherein:
   i) said first identification means includes means for generating a list of all the first blocks included in a second block for the source device with an indication of whether each first block is in a third block of an intermediate granularity, and
   ii) said second identification means includes means for generating a list of all the first blocks included in a second block for the destination device with an indication of whether each first block is to receive a third block from the source device.

27. A system as recited in claim 26 wherein said ordered copying means includes:
   i) means responsive to a write request to an identified source storage location for interrupting the operation of said ordered copy means,
   ii) means for copying data in the identified source storage location to a corresponding destination storage location, and
   iii) means for re-enabling said ordered copy means.

28. A system as recited in claim 26 wherein said ordered copy means includes:
- i) means responsive to one of read and write requests to an identified destination storage location during said ordered copying for interrupting the operation of said ordered copying means,
- ii) means for operating said copy means to copy data from a source storage location corresponding to the identified destination storage location, and
- iii) means for re-enabling said ordered copy means.

* * * * *